US006940977B1

(12) United States Patent
Manabe

(10) Patent No.: US 6,940,977 B1
(45) Date of Patent: Sep. 6, 2005

(54) DIGITAL VIDEO AND AUDIO DATA ENCRYPTION, DECRYPTION AND SYSTEM AUTHENTICATION

(75) Inventor: Koji Manabe, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/404,712

(22) Filed: Sep. 24, 1999

(30) Foreign Application Priority Data

Sep. 30, 1998 (JP) .......................................... 10-278153

(51) Int. Cl.[7] .............................................. H04N 7/167
(52) U.S. Cl. .................................... 380/232; 713/169
(58) Field of Search .............................. 380/232, 251, 380/200, 277; 713/168–171

(56) References Cited

U.S. PATENT DOCUMENTS

| 5,530,754 A | * | 6/1996 | Garfinkle | 725/8 |
| 5,592,651 A | * | 1/1997 | Rackman | 711/163 |
| 5,640,452 A | * | 6/1997 | Murphy | 380/258 |
| 5,944,824 A | * | 8/1999 | He | 713/201 |
| 6,028,933 A | * | 2/2000 | Heer et al. | 713/169 |

FOREIGN PATENT DOCUMENTS

JP          09035030 A  *  2/1997  ......... G06K/19/073

OTHER PUBLICATIONS

Kunzman, IEEE 1394 High Performance Serial Bus: The Digital Interface for ATV, 1995, pp. 406–407.*
"Copy Protect Technologies in IEEE1394, Integration With Combined Use of Public Key/Common Key"; Nikkei Electronics; Mar. 23, 1998; pp. 47–53.

* cited by examiner

Primary Examiner—Kim Vu
Assistant Examiner—Paula Klimach
(74) Attorney, Agent, or Firm—Foley & Lardner LLP

(57) ABSTRACT

Device ID detecting means detects an ID of a device on another party. Next, it is checked whether the device ID is included in historical information stored in authentication histories storing means. If the device ID is included in the historical information, authenticating means performs authentication with authenticating means on another party. Thereafter, when an AV data transmission direction is provided from a user to command input means, the command is notified through command control means to AV data transmitting means which starts transmission of AV data.

10 Claims, 5 Drawing Sheets

DIGITAL VIDEO AND AUDIO DATA ENCRYPTION, DECRYPTION AND SYSTEM AUTHENTICATION

BACKGROUND OF THE INVENTION

1. Field of the Invention

The present invention relates to a works protecting system for use when AV data is transmitted and received between devices, and to a works protecting method therefor.

2. Description of the Related Art

AV data, which has been conventionally handled as analogue data by users, is handled as digital data in recent years resulting from the widespread use of digital satellite broadcasting, Internet transmission, DVDs, or the like. Additionally, the IEEE1394 high-speed serial bus capable of transmitting digital data at high speed has become practical. From the viewpoint of works protection, works protection systems for use when AV data is transmitted and received between devices are proposed.

For example, "Copy protect technologies in IEEE1394, integration with combined use of public key/common key", Nikkei Electronics, 23 Mar., 1998, pp.47–53, describes a works protecting system comprising authenticating means and encrypting means. FIG. 1 shows the system in a block diagram and FIG. 2 in a state transition diagram. The configuration of the prior art works protecting system is as follows. When an AV data transmission direction is provided from a user to command input means 11 (S11), authenticating means 51 performs authentication through command control means 21 with authenticating means 141 on another party (S12). After the authentication, AV data transmitting means 31 starts transmission of AV data (S13). The AV data is encrypted at encrypting means 41 using a cryptographic key and transmitted to a transmission line through input/output means 61 In a transmitting-receiving device on another party, input/output means 111 receives the encrypted AV data from the transmission line. Decrypting means 131 decrypts the encrypted AV data using the cryptographic key and AV data receiving means 121 receives the decrypted AV data.

As is apparent from the above description, the prior art works protecting system performs authentication with a transmitting-receiving device on another party only after an AV data transmission direction is provided from a user, thereby having the disadvantage that it takes a long time before transmission of AV data.

SUMMARY OF THE INVENTION

In view of the aforementioned prior art disadvantage, it is an object of the present invention to provide a works protecting system capable of reducing the time from an AV data transmission direction to transmission of AV data and a works protecting method therefor.

The works protecting system according to the present invention comprises an AV data transmitting-receiving device for transmitting contents of works and a transmitting-receiving device on another party for receiving the works, wherein the AV data transmitting-receiving device comprises command input means, command control means, AV data transmitting means, encrypting means, first authenticating means, first input/output means, device ID detecting means, and authentication histories storing means, wherein the transmitting-receiving device on another party comprises second input/output means, AV data receiving means, decrypting means, and second authenticating means, and wherein the authenticating means performs a device authentication operation for mutually checking that both of the devices are devices based on certain rules, and a key exchange operation for sharing a cryptographic key for simultaneously encrypting and decrypting the works when the transmitting-receiving device on another party with a history that authentication has been previously performed therefor is connected to a transmission line.

The works protecting system may comprise an AV data transmitting-receiving device for transmitting contents of works and a plurality of transmitting-receiving devices on the other parties for receiving the works, wherein the AV data transmitting-receiving device comprises command input means, command control means, AV data transmitting means, encrypting means, first authenticating means, first input/output means, device ID detecting means, authentication histories storing means, and cryptographic key storing means, wherein each of the plurality of transmitting-receiving devices on the other parties comprises second input/output means, AV data receiving means, decrypting means, and second authenticating means, and wherein the authenticating means performs a device authentication operation for mutually checking that both the devices are devices-based on certain rules, and a key exchange operation for sharing a cryptographic key for simultaneously encrypting and decrypting the works when the transmitting-receiving device on another party with a history that authentication has been previously performed therefor is connected to a transmission line.

Additionally, the works protecting system may comprise an AV data transmitting-receiving device for transmitting contents of works and a transmitting-receiving device on another party for receiving the works, wherein the AV data transmitting-receiving device comprises command input means, command control means, AV data transmitting means, encrypting means, first authenticating means, first input/output means, and device ID detecting means, wherein the transmitting-receiving device on another party comprises second input/output means, AV data receiving means, decrypting means, and second authenticating means, and wherein the authenticating means performs a device authentication operation for mutually checking that both the devices are devices based on certain rules, and a key exchange operation for sharing a cryptographic key for simultaneously encrypting and decrypting the works when the transmitting-receiving device on another party is connected to a transmission line.

The works protecting method for the works protecting system according to the present invention has the steps of: detecting an ID of the transmitting-receiving device on another party with the device ID detecting means; checking whether the ID of the transmitting-receiving device on another party is included in historical information stored in the authentication histories storing means; performing the device authentication operation and the key exchange operation with the second authenticating means on another party by the first authenticating means if the ID of the transmitting-receiving device on another party is included in the historical information; thereafter, when a command input for an AV data transmission direction is provided from a user to the command input means, notifying the command to the AV data transmitting means through the command control means and starting transmission of the AV data with the AV data transmitting means; if the ID of the transmitting-receiving device on another party is not included in the historical information, waiting for a command input for an AV data transmission direction from a user to the command input means; when the command input for the AV data transmission direction is provided, performing the device authentication operation and the key exchange operation with the second authenticating means on another party by the first authenticating means; after the device authentication and the key exchange operations, recording the ID of the transmitting-receiving device on another party as historical information in the authentication histories storing means; notifying the command to the AV data transmitting means through the command control means and starting transmission of the AV data with the AV data transmitting means; encrypting the AV data with the encrypting means using the cryptographic key and sending the encrypted AV data to the first input/output means; sending the encrypted AV data to a transmission line with the first input/output means; receiving the encrypted AV data from the transmission line with the second input/output means; decrypting the encrypted AV data with the decrypting means using the cryptographic key and sending the decrypted AV data to the AV data receiving means; and receiving the decrypted AV data with the AV data receiving means.

The works protecting method for the works protecting system may have the steps of: detecting an ID of the transmitting-receiving device on the first other party with the device ID detecting means; checking whether the ID of the transmitting-receiving device on the first other party is included in historical information stored in the authentication histories storing means; performing the device authentication operation and the key exchange operation with the second authenticating means on the first other party by the first authenticating means if the ID of the transmitting-receiving device on the first other party is included in the historical information; recording a cryptographic key shared as a result of the key exchange operation as a first cryptographic key in the cryptographic key storing means; detecting an ID of the transmitting-receiving device on the second other party with the device ID detecting means; checking whether the ID of the transmitting-receiving device on the second other party is included in historical information stored in the authentication histories storing means; performing the device authentication operation and the key exchange operation with the second authenticating means on the second other party by the first authenticating means if the ID of the transmitting-receiving device on the second other party is included in the historical information; recording a cryptographic key shared as a result of the key exchange operation as a second cryptographic key in the cryptographic key storing means; thereafter, when a command input for an AV data transmission direction for the transmitting-receiving device on the first other party or for the transmitting-receiving device on the second other party is provided from a user to the command input means, notifying the command to the AV data transmitting means through the command control means and starting transmission of the AV data with the AV data transmitting means; if the ID of the transmitting-receiving device on the first other party is not included in the historical information, waiting for a command input for an AV data transmission direction for the transmitting-receiving device on the first other party from a user to the command input means; when the command input for the AV data transmission direction is provided, performing the device authentication operation and the key exchange operation with the second authenticating means on the first other party by the first authenticating means; after the device authentication and the key exchange operations, recording the ID of the transmitting-receiving device on the first other party as historical information in the authentication histories storing means; recording a cryptographic key shared as a result of the key exchange operation as a first cryptographic key in the cryptographic key storing means; if the ID of the transmitting-receiving device on the second other party is not included in the historical information, waiting for a command input for an AV data transmission direction for the transmitting-receiving device on the second other party from a user to the command input means; when the command input for the AV data transmission direction is provided, performing the device authentication operation and the key exchange operation with the second authenticating means on the second other party by the first authenticating means; after the device authentication and the key exchange operations, recording the ID of the transmitting-receiving device on the second other party as historical information in the authentication histories storing means; recording a cryptographic key shared as a result of the key exchange operation as a second cryptographic key in the cryptographic key storing means; notifying the command to the AV data transmitting means through the command control means and starting transmission of the AV data to the transmitting-receiving device on the first other party or to the transmitting-receiving device on the second other party with the AV data transmitting means; if the command input for the AV data transmission direction for the transmitting-receiving device on the first other party is provided from a user to the command input means: encrypting the AV data with the encrypting means using the first cryptographic key and sending the encrypted AV data to the first input/output means; sending the encrypted AV data to a transmission line with the first input/output means; receiving the encrypted AV data from the transmission line with the second input/output means on the first other party; decrypting the encrypted AV data with the decrypting means on the first other party using the first cryptographic key and sending the decrypted AV data to the AV data receiving means on the first other party; and receiving the decrypted AV data with the AV data receiving means; if the command input for the AV data transmission direction for the transmitting-receiving device on the second other party is provided from a user to the command input means: encrypting the AV data with the encrypting means using the second cryptographic key and sending the encrypted AV data to the first input/output means; sending the encrypted AV data to a transmission line with the first input/output means; receiving the encrypted AV data from the transmission line with the second input/output means on the second other party; decrypting the encrypted AV data with the decrypting means on the second other party using the second cryptographic key and sending the decrypted AV data to the AV data receiving means on the second other party; and receiving the decrypted AV data with the AV data receiving means.

Additionally, the transmission line for the AV data may be the IEEE1394 high-speed serial bus.

The works protecting system and the works protecting method therefor according to the present invention are characterized in that it performs device authentication and key exchange when a transmitting-receiving device with a history that authentication has been previously performed therefor is connected to a transmission line, and are capable of significantly reducing the time from the command input from a user to the start of transmission of contents of works as compared with the prior art.

The device ID detecting means detects, when a transmitting-receiving device on another party is connected to a transmission line, a device ID thereof through the input/output means. As a transmission line, the IEEE1394 high-speed serial bus may be used, for example. The transmitting-receiving device on another party is, for example, a device for transmitting and receiving contents of works which is configured to have input/output means, AV data receiving means, decrypting means, and authenticating means. When the device ID detecting means detects the device ID of the transmitting-receiving device on another party, it is checked whether the device ID is included in historical information stored in the authentication histories storing means.

If the device ID is included in the historical information, the authenticating means performs authentication with the authenticating means on another party. Authentication includes a device authentication operation for mutually checking that both devices are devices based on certain rules, and a key exchange operation for sharing a cryptographic key for simultaneously encrypting and decrypting works. Thereafter, whenever an AV data transmission direction is provided from a user to the command input means, the command is notified through the command control means to the AV data transmitting means which starts transmission of AV data. The AV data is encrypted at the encrypting means using the cryptographic key and is transmitted to a transmission line such as the IEEE1394 high-speed serial bus through the input/output means. In the transmitting-receiving device on another party, the input/output means receives the encrypted AV data from the transmission line such as the IEEE1394 high-speed serial bus. The decrypting means decrypts the encrypted AV data using the cryptographic key and the AV data receiving means receives the decrypted AV data.

If the device ID is not included in the historical information, the system waits for an AV data transmission direction from a user to the command input means. When an AV data transmission direction is provided, the authenticating means performs authentication with the authenticating means on another party. After the authentication, the device ID on another party is recorded in the authentication histories storing means as historical information. The AV data transmitting means starts transmission of AV data. The AV data is encrypted at the encrypting means using the cryptographic key and is transmitted to the transmission line through the input/output means. In the transmitting-receiving device on another party, the input/output means receives the encrypted AV data from the transmission line. The decrypting means decrypts the encrypted AV data using the cryptographic key and the AV data receiving means receives the decrypted AV data.

DETAILED DESCRIPTION OF THE PREFERRED EMBODIMENTS

First Embodiment of the Present Invention

Figure 1:
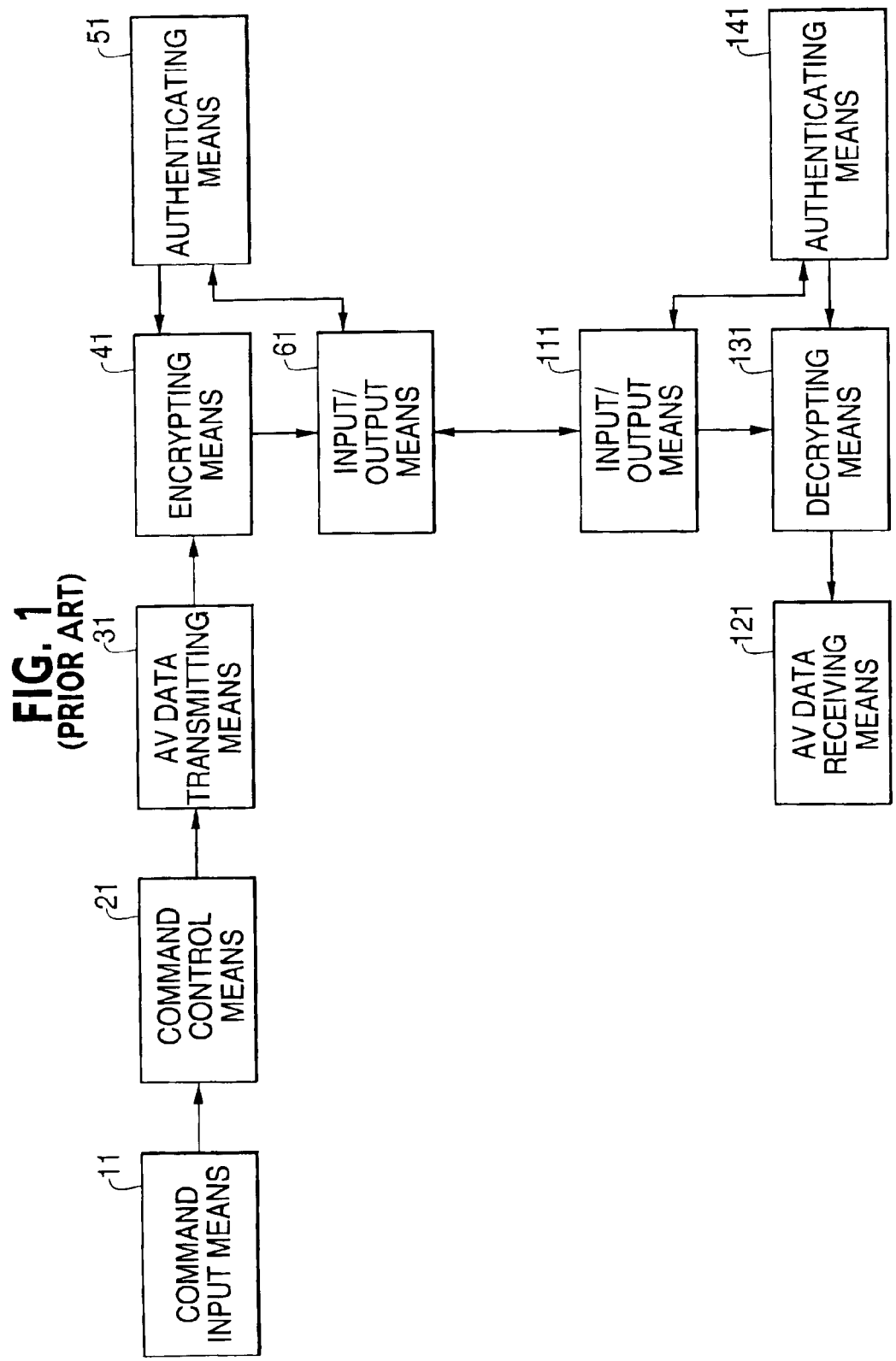
FIG. 1 is a block diagram showing a prior art works protecting system.
Figure 2:
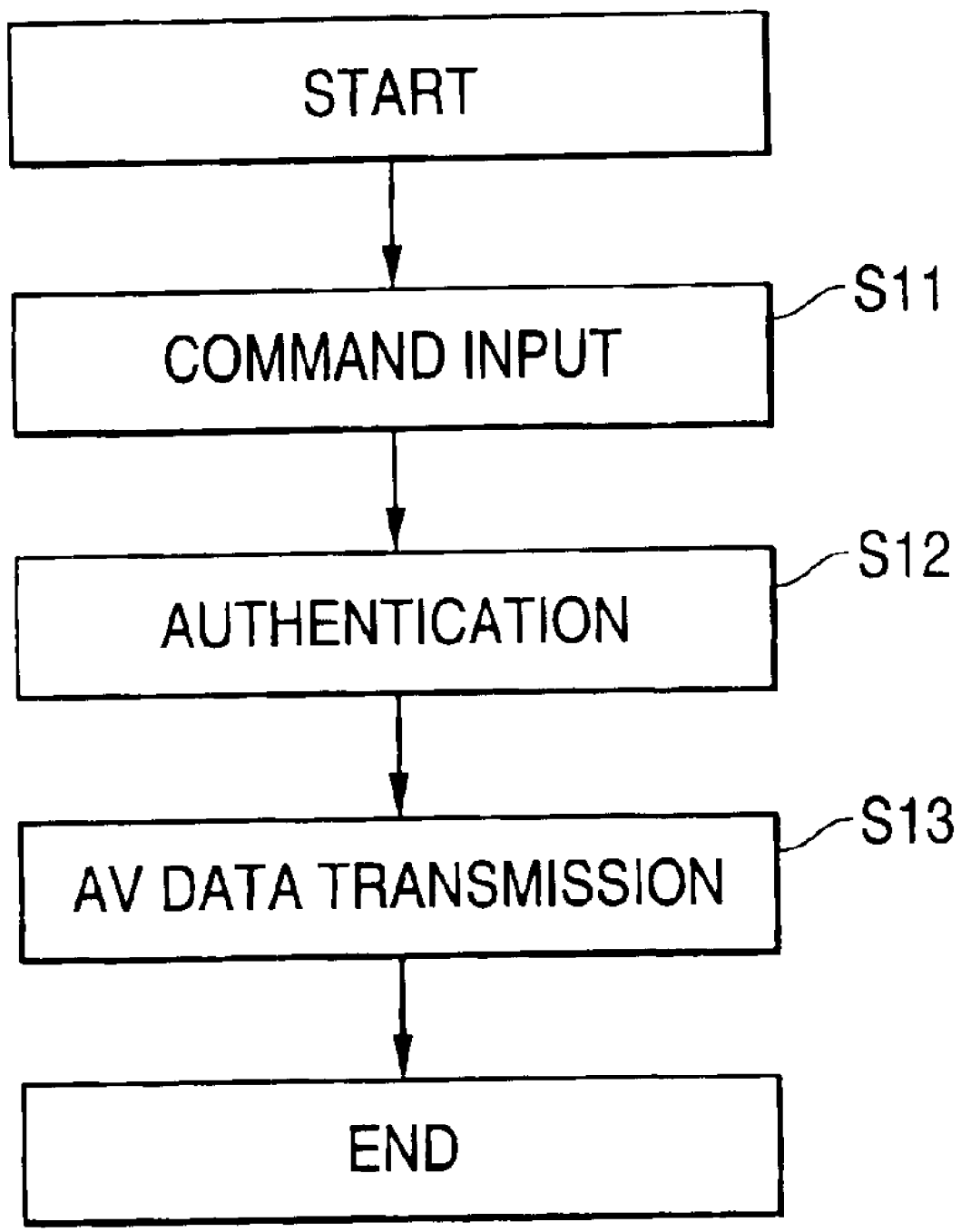
FIG. 2 is a state transition diagram of the prior art works protecting system.
Figure 3:
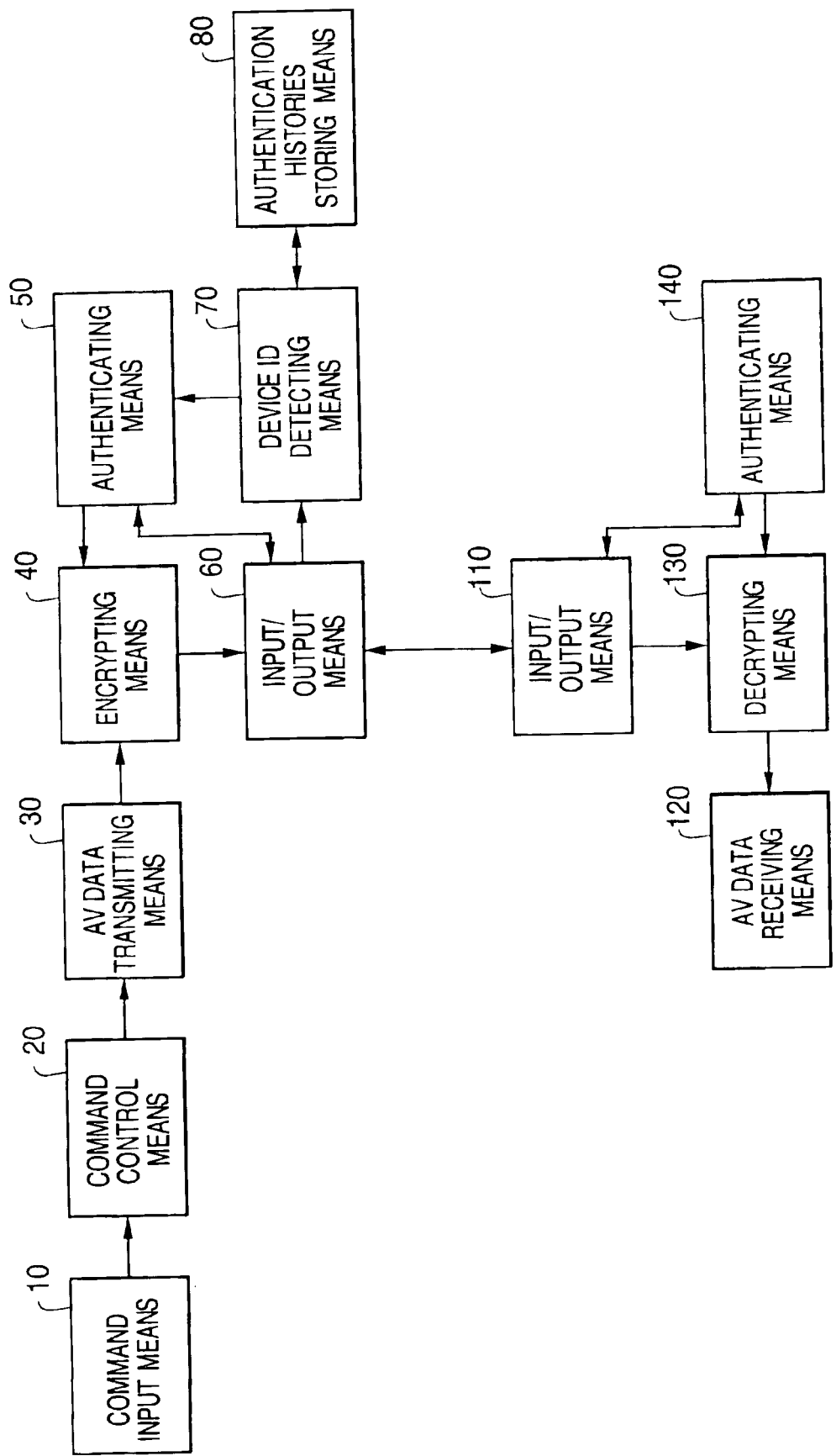
FIG. 3 is a block diagram showing a configuration of a works protecting system of a first embodiment according to the present invention.

FIG. 3 is a block diagram showing a configuration of a works protecting system of a first embodiment according to the present invention. Referring to FIG. 3, device ID detecting means 70 detects, when a transmitting-receiving device on another party is connected to a transmission line, a device ID thereof through input/output means 60. For a transmission line, the IEEE1394 high-speed serial bus is preferable, for example. The transmitting-receiving device on another party is, for example, a device for transmitting and receiving contents of works which is configured to comprise input/output means 110, AV data receiving means 120, decrypting means 130, and authenticating means 140, and specifically, a digital television set, a writable DVD or DVD-RAM, a digital VTR or D-VHS, or the like is preferable. When device ID detecting means 70 detects the device ID of the transmitting-receiving device on another party, it is checked whether the device ID is included in historical information stored in authentication histories storing means 80. If the historical information includes the device ID, authenticating means 50 performs authentication with authenticating means 140 on another party.

The authentication comprises a device authentication operation for mutually checking that both devices are devices based on certain rules, and a key exchange operation for sharing a cryptographic key for simultaneously encrypting and decrypting works. Although previously devised various schemes may be used for a digital signature scheme and a key distribution scheme for authentication, it is preferable to use an elliptic DSA (Digital Signature Algorithm) signature and an elliptic DH (Diffie-Hellman) key distribution. The elliptic DSA signature (hereinafter referred to as EC-DSA) will be described in the following. The EC-DSA is defined in ANSI X9.62 or the like, and the contents thereof comprise three stages: key generation, signature generation, and signature verification.

First, the procedure of the key generation is as follows.

(1) EC-DSA Key Generation

At device A:

1. Elliptic curve E formed on ZP is elected. The number of points on E(ZP) should be capable to be divided by large prime number n.
2. Point P∈E(ZP) for order n is selected.
3. Integer d which is statically particular and unpredictable is selected from interval [1,n−1].
4. Q=dP is calculated.
5. The public key for A is set as (E,P,n,Q) and the secret key for A is set as d.

Next, the procedure of the signature generation is as follows.

(2) EC-DSA Signature Generation

At device A, message m is encrypted as follows.

1. Integer k which is statically particular and unpredictable is selected from interval [1,n−1].
2. kP=(x1,y1) and r=x1 mod n are calculated, wherein x1 is considered as one integer, for example by conversion from binary representation. If r=0, the procedure returns to step 1. (for security reasons. If r=0, encryption equation s=k−1{h(m)+dr}mod n does not include secret key d.)
3. k−1 mod n is calculated.
4. s=k−1{(h(m)+dr}mod n is calculated, wherein h is Secure Hash Algorithm (SHA-1).
5. If s=0, the procedure returns to step 1. (If s=0, s−1 mod n does not exist; s−1 is required at step 2 for the signature verification.)

6. The signature for message m is set as a set of integers (r,s)

The procedure of the signature verification is as follows.

(3) EC-DSA Signature Verification

Device B performs the followings to verify signature (r,s) for device A in m.
1. A true copy of public key (E,P,n,Q) for A is obtained.
2. Verification that r and s are integers in interval [1,n−1] is performed.
3. w=s−1 mod n and h(m) are calculated.
4. u1=h(m)w mod n and u2=rw mod n are calculated.
5. u1P+u2Q=(x0,y0) and v=x0 mod n are calculated.
6. If v=r, the signature is admitted.

Next, the elliptic DH key distribution (hereinafter referred to as EC-DH) will be described. The EC-DH is defined in ANSI X9.63 or the like, and the contents thereof comprises two stages: key generation and exchange, and key sharing.

First, the procedure of the key generation and exchange is as follows.

(1) EC-DH Key Generation and Exchange

At device A:
1. Integer x which is statically particular and unpredictable is selected from interval [2,n−2].
2. a=xP is calculated.
3. Device A sends a to device B.

At device B:
1. Integer y which is statically particular and unpredictable is selected from interval [2,n−2].
2. b=yP is calculated.
3. Device B sends b to device A.

Next, the procedure of the key sharing is described.

(2) EC-DH Key Sharing
1. At device A, a common key is generated with KA=xb=xyp.
2. At device B, a common key is generated with KB=xa=xyP.
3. Since KA=KB, device A and device B share the key.

After the authentication, whenever an AV data transmission direction is provided from a user to command input means 10, the command is notified through command control means 20 to AV data transmitting means 30 which starts the transmission of AV data. As command input means, a keyboard, a mouse, a remote control, or the like is preferable, for example. As AV data, AV data in various formats may be utilized, and a transport stream compressed in compliance with MPEG 2 standard is preferable. As AV data transmitting means 30, a digital satellite broadcasting receiver, a receiver for AV data from Internet, a DVD apparatus or the like is preferable, for example. The AV data is encrypted using a cryptographic key at encrypting means 40 and transmitted to a transmission line such as the IEEE1394 high-speed serial bus through input/output means 60.

As an encrypting scheme used in the encrypting means, various block ciphers previously devised may be used. For example, blowfish encryption is preferable. In the transmitting-receiving device on another party, input/output means 110 receives the encrypted AV data from the transmission line such as the IEEE1394 high-speed serial bus. Decrypting means 130 decrypts the encrypted AV data using the cryptographic key, and AV data receiving means 120 receives the decrypted AV data. The AV data is subjected to MPEG2 decoding as required and then displayed and audio-outputted if the transmitting-receiving device on another party is a digital television set, while the AV data is converted in its format as required and then written and saved if the transmitting-receiving device on another party is a writable DVD apparatus or digital VTR.

If the historical information does not include the device ID on another party, the system waits for an AV data transmission direction from a user to command input means 10. When a command input, that is, an AV data transmission direction is provided, authenticating means 50 performs authentication with authenticating means 140 on another party. After the authentication, the device ID on another party is recorded as historical information in authentication histories storing means 80. AV data transmitting means 30 starts transmission of AV data. The AV data is encrypted at encrypting means 40 using a cryptographic key and transmitted to the transmission line through input/output means 60. In the transmitting-receiving device on another party, input/output means 110 receives the encrypted AV data from the transmission line. Decrypting means 130 decrypts the encrypted AV data using the cryptographic key, and AV data receiving means 120 receives the decrypted AV data.

Figure 4:
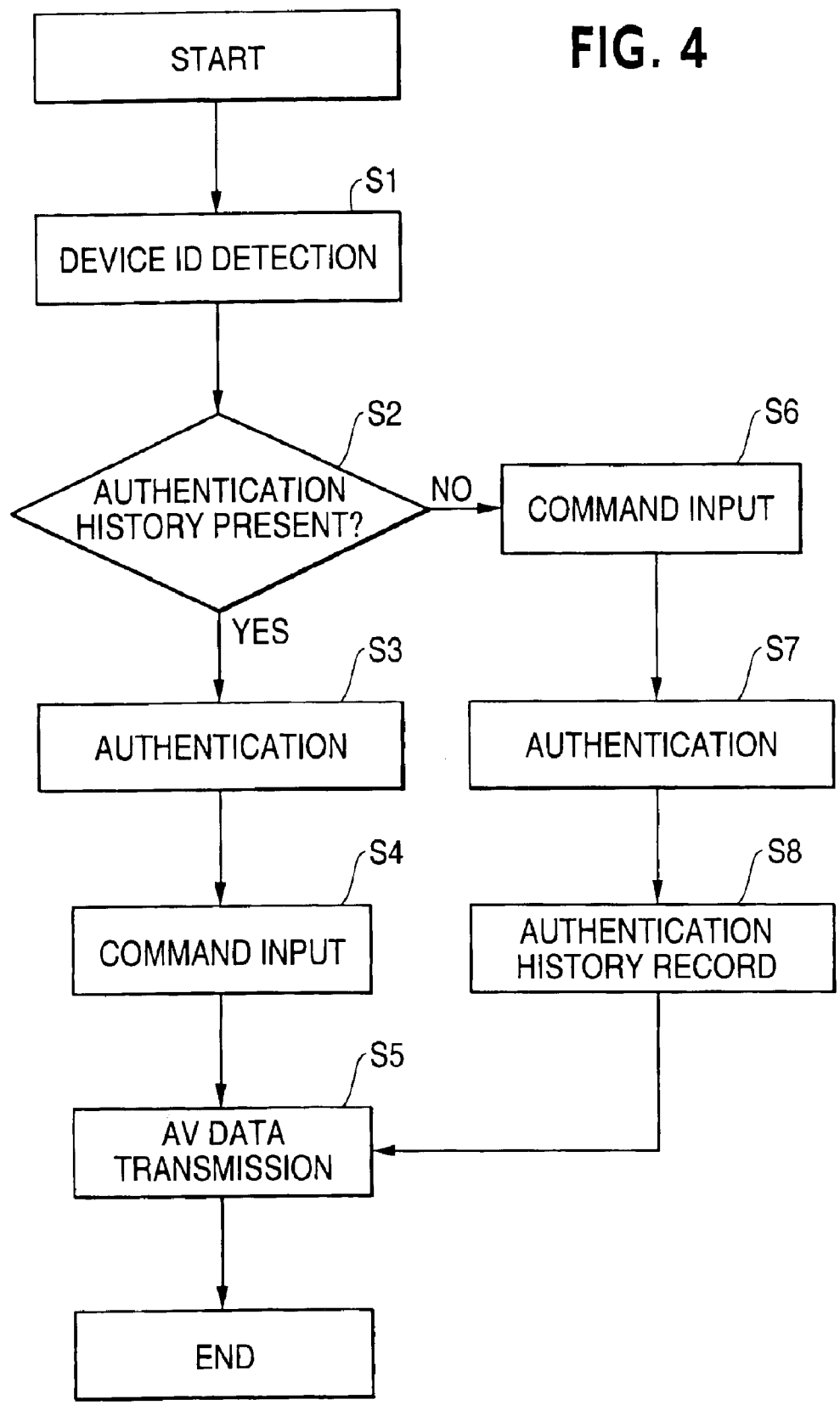
FIG. 4 is a state transition diagram showing an operational state of the works protecting system of a first embodiment according to the present invention.

FIG. 4 is a state transition diagram showing an operational state of the works protecting system of the first embodiment according to the present invention. Referring to FIG. 4, device ID detecting means 70 detects a device ID on another party (S1). Next, it is checked whether the device ID is included in historical information stored in authentication histories storing means 80 (S2). If the historical information includes the device ID, authenticating means 50 performs authentication with authenticating means 140 on another party (S3). Thereafter, when an AV data transmission direction is provided from a user to command input means 10 (S4), the command is notified through command control means 20 to AV data transmitting means 30 which starts transmission of AV data (S5).

If the historical information does not include the device ID on another party, the system waits for an AV data transmission direction from a user to command input means 10. When the AV data transmission direction is provided (S6), authenticating means 50 performs authentication with authenticating means 140 on another party (S7). After the authentication, the device ID on another party is recorded as historical information in authentication histories storing means 80 (S8). AV data transmitting means 30 starts transmission of AV data (S5). In the subsequent repeated operations, since the device ID has been recorded as an authentication history, authenticating means 50 performs authentication (S3), and when an AV data transmission direction is provided form a user to command input means 10 (S4), the command is notified through command control means 20 to AV data transmitting means 30 which starts transmission of AV data (S5).

Second Embodiment of the Present Invention

Next, a second embodiment of the present invention will be described in detail with reference to the drawings.

Figure 5:
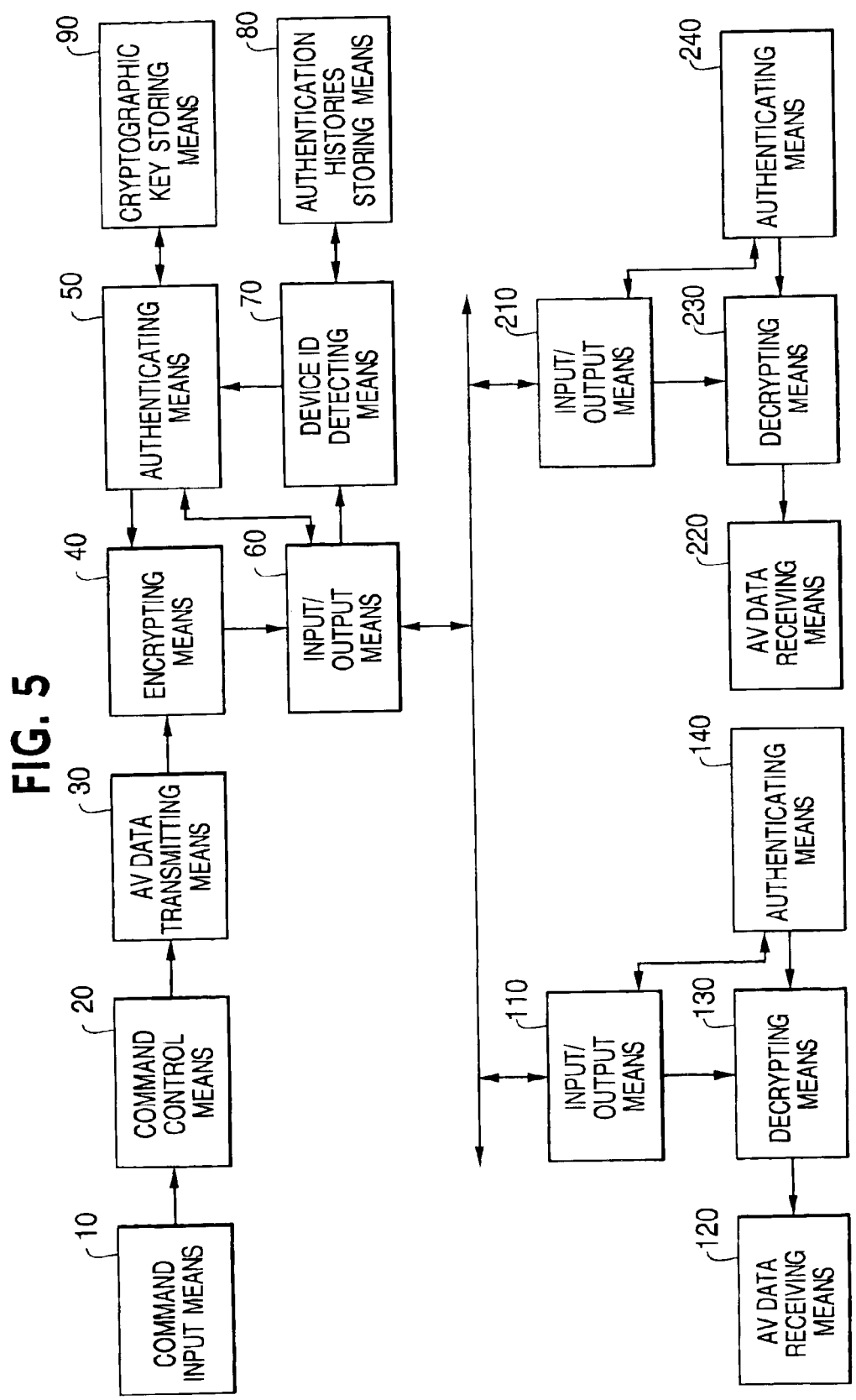
FIG. 5 is a block diagram showing a configuration of a works protecting system of a second embodiment according to the present invention.

Referring to FIG. 5, the present embodiment is configured to have a plurality of transmitting-receiving devices on the other parties to which contents of works are to be transmitted. Specifically, device ID detecting means 70 detects, when a transmitting-receiving device is connected to a transmission line, a device ID thereof through input/output means 60. When device ID detecting means 70 detects a device ID of a transmitting-receiving device on the first other party, it is checked whether the device ID is included in historical information stored in authentication histories storing means 80. If the historical information includes the device ID, authenticating means 50 performs authentication with authenticating means 140 on another party and obtains a cryptographic key as a result of key sharing. The cryptographic key is recorded in cryptographic key storing means 90 as a first cryptographic key. When device ID detecting means 70 detects a device ID of a transmitting-receiving device on the second other party, it is checked whether the device ID is included in historical information stored in authentication histories storing means 80. If the historical information includes the device ID, authenticating means 50 performs authentication with authenticating means 240 on another party and obtains a cryptographic key as a result of key sharing. The cryptographic key is recorded in cryptographic key storing means 90 as a second cryptographic key.

If the historical information does not include the transmitting-receiving device ID on the first other party, the system waits a command input for an AV data transmission direction for the transmit-receiver device on the first other party from a user to command input means 10. When the command input for the AV data transmission direction is provided, authenticating means 50 performs a device authentication operation and a key exchange operation with authenticating means 140 on the first other party. After the device authentication and the key exchange operations, the transmitting-receiving device ID on the first other party is recorded as historical information in authentication histories storing means 80. A cryptographic key shared as a result of the key exchange operation is recorded as a first cryptographic key in cryptographic key storing means 90.

If the historical information does not include the transmitting-receiving device ID on the second other party, the system waits a command input for an AV data transmission direction for the transmit-receiver device on the second other party from a user to command input means 10. When the command input for the AV data transmission direction is provided, authenticating means 50 performs a device authentication operation and a key exchange operation with authenticating means 240 on the second other party. After the device authentication and the key exchange operations, the transmitting-receiving device ID on the second other party is recorded as historical information in authentication histories storing means 80. A cryptographic key shared as a result of the key exchange operation is recorded as a second cryptographic key in cryptographic key storing means 90.

After the authentication and record of the cryptographic key, whenever an AV data transmission direction for the transmitting-receiving device on the first other party is provided from a user to command input means 10, the command is notified through command control means 20 to AV data transmitting means 30 which starts transmission of AV data. The AV data is encrypted at encrypting means 40 using the cryptographic key for the transmitting-receiving device on the first other party recorded in cryptographic key storing means 90, and transmitted to a transmission line through input/output means 60. In the transmitting-receiving device on the first other party, input/output means 110 receives the encrypted AV data from the transmission line. Decrypting means 130 decrypts the encrypted AV data using the cryptographic key for the transmitting-receiving device on the first other party, and AV data receiving means 120 receives the decrypted AV data.

When an AV data transmission direction for the transmitting-receiving device on the second other party is provided from a user to command input means 10, the command is notified through command control means 20 to AV data transmitting means 30 which starts transmission of AV data. The AV data is encrypted at encrypting means 40 using the cryptographic key for the transmitting-receiving device on the second other party recorded in cryptographic key storing means 90, and transmitted to a transmission line through input/output means 60. In the transmitting-receiving device on the second other party, input/output means 210 receives the encrypted AV data from the transmission line. Decrypting means 230 decrypts the encrypted AV data using the cryptographic key for the transmitting-receiving device on the second other party, and AV data receiving means 220 receives the decrypted AV data.

As is apparent from the present embodiment, the works protecting scheme and apparatus of the present invention have an effect that the time from the command input from a user for directing transmission of contents of works to the start of transmission of the contents of works can be substantially reduced as compared with the prior art even with a plurality of transmitting-receiving devices on the other parties.

Although the foregoing description shows an example in which an AV data transmitter is configured to comprise command input means 10 and command control means 20, the AV data transmitter may be configured not to have command input means 10 and command control means 20.

Additionally, although the foregoing description shows an example in which the system comprises one AV data transmitter, the system may be configured to have a plurality of AV data transmitters without any loss of effects provided by the present invention as a matter of course.

An embodiment configured not to include authentication histories storing means 80 in the embodiments shown in FIG. 3 and FIG. 5 serves as another embodiment of the present invention. In this embodiment, when a transmitting-receiving device is connected to a transmission line and a device ID thereof is detected by device ID detecting means 70, authenticating means 50 performs authentication with authenticating means on another party independently of historical information in the embodiment, since authentication is performed independently of historical information, it apparently has an effect that time can be substantially reduced as compared with the prior art even for the first transmission of contents of works after a new AV data transmitter is connected.

As described above, the present invention provides an effect that the time from the command input from a user for directing transmission of contents of works to the start of transmission of the contents of works can be significantly reduced as compared with the prior art.

The reason thereof is that when a transmitting-receiving device with a history that authentication has been previously performed therefor is connected to a transmission line, device authentication and key exchange are performed before a command is inputted from a user.

What is claimed is:

1. A works protecting system comprising an AV data transmitting-receiving device for transmitting contents of works and a transmitting-receiving device on another party for receiving the works, wherein said AV data transmitting-receiving device comprises command input means, command control means, AV data transmitting means, encrypting means, first authenticating means, first input/output means, device ID detecting means, and authentication histories storing means, wherein said transmitting-receiving device on another party comprises second input/output means, AV data receiving means, decrypting means, and second authenticating means, wherein the device ID detecting means is configured for detecting, when the transmitting-receiving device on the another party is connected to a transmission line, a device ID thereof, and wherein said authenticating means performs a device authentication operation for mutually checking that both said devices are devices based on certain rules and the detected device ID of the transmitting-receiving device on the another party, and a key exchange operation for sharing a cryptographic key for simultaneously encrypting and decrypting the works when said transmitting-receiving device on another party with a history that authentication has been previously performed therefor is connected to a transmission line.

2. A works protecting system comprising an AV data transmitting-receiving device for transmitting contents of works and a plurality of transmitting-receiving devices on other parties for receiving the works, wherein said AV data transmitting-receiving device comprises command input means, command control means, AV data transmitting means, encrypting means, first authenticating means, first input/output means, device ID detecting means, authentication histories storing means, and cryptographic key storing means, wherein each of said plurality of transmitting-receiving devices on the other parties comprises second input/output means, AV data receiving means, decrypting means, and second authenticating means, wherein the device ID detecting means is configured for detecting, when the transmitting-receiving device on one of the other parties is connected to a transmission line, a device ID thereof, and wherein said authenticating means performs a device authentication operation for mutually checking that both said devices are devices based on certain rules and the detected device ID of the transmitting-receiving device on the one of other parties, and a key exchange operation for sharing a cryptographic key for simultaneously encrypting and decrypting the works when said transmitting-receiving device on another party with a history that authentication has been previously performed therefor is connected to a transmission line.

3. A works protecting system comprising an AV data transmitting-receiving device for transmitting contents of works and a transmitting-receiving device on another party for receiving the works, wherein said AV data transmitting-receiving device comprises command input means, command control means, AV data transmitting means, encrypting means, first authenticating means, first input/output means, and device ID detecting means, wherein said transmitting-receiving device on another party comprises second input/output means, AV data receiving means, decrypting means, and second authenticating means, wherein the device ID detecting means is configured for detecting, when the transmitting-receiving device on the another party is connected to a transmission line, a device ID thereof, and wherein said authenticating means performs a device authentication operation for mutually checking that both said devices are devices based on certain rules and the detected device ID of the transmitting-receiving device on the another party, and a key exchange operation for sharing a cryptographic key for simultaneously encrypting and decrypting the works when said transmitting-receiving device on another party is connected to a transmission line.

4. A works protecting method for the works protecting system according to claim 1, said method comprising the steps of:

detecting an ID of said transmitting-receiving device on another party with said device ID detecting means;

checking whether the ID of said transmitting-receiving device on another party is included in historical information stored in said authentication histories storing means;

performing the device authentication operation and the key exchange operation with said second authenticating means on another party by said first authenticating means, if the ID of said transmitting-receiving device on another party is included in the historical information;

notifying the command to said AV data transmitting means through said command control means and starting transmission of the AV data with said AV data transmitting means, when a command input for an AV data transmission direction is provided from a user to said command input means;

waiting for a command input for an AV data transmission direction from a user to said command input means, if the ID of said transmitting-receiving device on another party is not included in the historical information;

performing the device authentication operation and the key exchange operation with said second authenticating means on another party by said first authenticating means, when the command input for the AV data transmission direction is provided;

recording the ID of said transmitting-receiving device on another party as historical information in said authentication histories storing means after the device authentication and the key exchange operations;

notifying the command to said AV data transmitting means through said command control means and starting transmission of the AV data with said AV data transmitting means;

encrypting the AV data with said encrypting means using the cryptographic key and sending the encrypted AV data to said first input/output means;

sending the encrypted AV data to a transmission line with said first input/output means;

receiving the encrypted AV data from the transmission line with said second input/output means;

decrypting the encrypted AV data with said decrypting means using the cryptographic key and sending the decrypted AV data to said AV data receiving means; and receiving the decrypted AV data with said AV data receiving means.

5. A works protecting method for the works protecting system according to claim 2, said method comprising the steps of:

detecting an ID of said transmitting-receiving device on a first other party with said device ID detecting means;

checking whether the ID of said transmitting-receiving device on the first other party is included in historical information stored in said authentication histories storing means;

performing the device authentication operation and the key exchange operation with said second authenticating means on the first other party by said first authenticating means, if the ID of said transmitting-receiving device on the first other party is included in the historical information;

recording a cryptographic key shared as a result of the key exchange operation as a first cryptographic key in said cryptographic key storing means;

detecting an ID of said transmitting-receiving device on a second other party with said device ID detecting means;

checking whether the ID of said transmitting-receiving device on the second other party is included in historical information stored in said authentication histories storing means;

performing the device authentication operation and the key exchange operation with said second authenticating means on the second other party by said first authenticating means, if the ID of said transmitting-receiving device on the second other party is included in the historical information;

recording a cryptographic key shared as a result of the key exchange operation as a second cryptographic key in said cryptographic key storing means;

notifying the command to said AV data transmitting means through said command control means and starting transmission of the AV data with said AV data transmitting means, when a command input for an AV data transmission direction for said transmitting-receiving device on the first other party or for said transmitting-receiving device on the second other party is provided from a user to said command input means;

waiting for a command input for an AV data transmission direction for said transmitting-receiving device on the first other party from a user to said command input means, if the ID of said transmitting-receiving device on the first other party is not included in the historical information;

performing the device authentication operation and the key exchange operation with said second authenticating means on the first other party by said first authenticating means, when the command input for the AV data transmission direction is provided;

recording the ID of said transmitting-receiving device on the first other party as historical information in said authentication histories storing means after the device authentication and the key exchange operations;

recording a cryptographic key shared as a result of the key exchange operation as a first cryptographic key in said cryptographic key storing means;

waiting for a command input for an AV data transmission direction for said transmitting-receiving device on the second other party from a user to said command input means, if the ID of said transmitting-receiving device on the second other party is not included in the historical information;

performing the device authentication operation and the key exchange operation with said second authenticating means on the second other party by said first authenticating means, when the command input for the AV data transmission direction is provided;

after the device authentication and the key exchange operations, recording the ID of said transmitting-receiving device on the second other party as historical information in said authentication histories storing means;

recording a cryptographic key shared as a result of the key exchange operation as a second cryptographic key in said cryptographic key storing means;

notifying the command to said AV data transmitting means through said command control means and starting transmission of the AV data to the transmitting-receiving device on the first other party or to the transmitting-receiving device on the second other party with said AV data transmitting means;

encrypting the AV data with said encrypting means using the first cryptographic key and sending the encrypted AV data to said first input/output means, if the command input for the AV data transmission direction for said transmitting-receiving device on the first other party is provided from a user to said command input means;

sending the encrypted AV data to a transmission line with said first input/output means;

receiving the encrypted AV data from the transmission line with said second input/output means on the first other party;

decrypting the encrypted AV data with said decrypting means on the first other party using the first cryptographic key and sending the decrypted AV data to said AV data receiving means on the first other party;

receiving the decrypted AV data with said AV data receiving means;

encrypting the AV data with said encrypting means using the second cryptographic key and sending the encrypted AV data to said first input/output means, if the command input for the AV data transmission direction for said transmitting-receiving device on the second other party is provided from a user to said command input means;

sending the encrypted AV data to a transmission line with said first input/output means;

receiving the encrypted AV data from the transmission line with said second input/output means on the second other party;

decrypting the encrypted AV data with said decrypting means on the second other party using the second cryptographic key and sending the decrypted AV data to said AV data receiving means on the second other party; and receiving the decrypted AV data with said AV data receiving means.

6. The works protecting method for the works protecting system according to claim 4, wherein the transmission line for said AV data comprises a IEEE1394 high-speed serial bus.

7. The works protecting method for the works protecting system according to claim 5, wherein the transmission line for said AV data comprises a IEEE1394 high-speed serial bus.

8. A works protecting system comprising an AV data transmitting device for transmitting contents of works and a transmitting-receiving device on another party for receiving the works, wherein said AV data transmitting device comprises first authenticating means and device ID detecting means, wherein said transmitting-receiving device on another party comprises second authenticating means, wherein the device ID detecting means is configured for detecting, when the transmitting-receiving device on the another party is connected to a transmission line, a device ID thereof, and wherein said first and second authenticating means performs a device authentication operation for mutually checking that both said devices are devices based on certain rules and the detected device ID of the transmitting-receiving device on the another party, and a key exchange operation for sharing a cryptographic key for substantially simultaneously encrypting and decrypting the works when said transmitting-receiving device on another party with a history that authentication has been previously performed therefore is connected to a transmission line.

9. A works protecting system comprising an AV data transmitting device for transmitting contents of works and a plurality of transmitting-receiving devices on the other parties for receiving the works, wherein said AV data transmitting device comprises first authenticating means and device ID detecting means, wherein each of said plurality of transmitting-receiving devices on the other parties comprises second authenticating means, wherein the device ID detecting means is configured for detecting, when the transmitting-receiving device on one of the other parties is connected to a transmission line, a device ID thereof, and wherein said first and second authenticating means performs a device authentication operation for mutually checking that both said devices are devices based on certain rules and the detected device ID of the transmitting-receiving device on the one of other parties, and a key exchange operation for sharing a cryptographic key for substantially simultaneously encrypting and decrypting the works when said transmitting-receiving device on another party with a history that authentication has been previously performed therefore is connected to a transmission line.

10. A works protecting system comprising an AV data transmitting device for transmitting contents of works and a transmitting-receiving device on another party for receiving the works, wherein said AV data transmitting device comprises first authenticating means and device ID detecting means, wherein said transmitting receiving device on another party comprises second authenticating means, wherein the device ID detecting means is configured for detecting, when the transmitting-receiving device on the another party is connected to-a transmission line, a device ID thereof, and wherein said first and second authenticating means performs a device authentication operation for mutually checking that both said devices are devices based on certain rules and the detected device ID of the transmitting-receiving device on the another party, and a key exchanges operation for sharing a cryptographic key for substantially simultaneously encrypting and decrypting the works when said transmitting-receiving device on another party is connected to a transmission line.

\* \* \* \* \*